Nov. 7, 1950   J. W. GRAY   2,529,469
SHADED POLE MOTOR WITH THYRATRON CONTROL
Filed July 1, 1949   3 Sheets-Sheet 1

Inventor
JOHN W. GRAY
Attorney

Nov. 7, 1950 J. W. GRAY 2,529,469
SHADED POLE MOTOR WITH THYRATRON CONTROL
Filed July 1, 1949 3 Sheets-Sheet 2

Inventor
JOHN W. GRAY
H. L. Mackey
Attorney

Nov. 7, 1950 J. W. GRAY 2,529,469
SHADED POLE MOTOR WITH THYRATRON CONTROL
Filed July 1, 1949 3 Sheets—Sheet 3
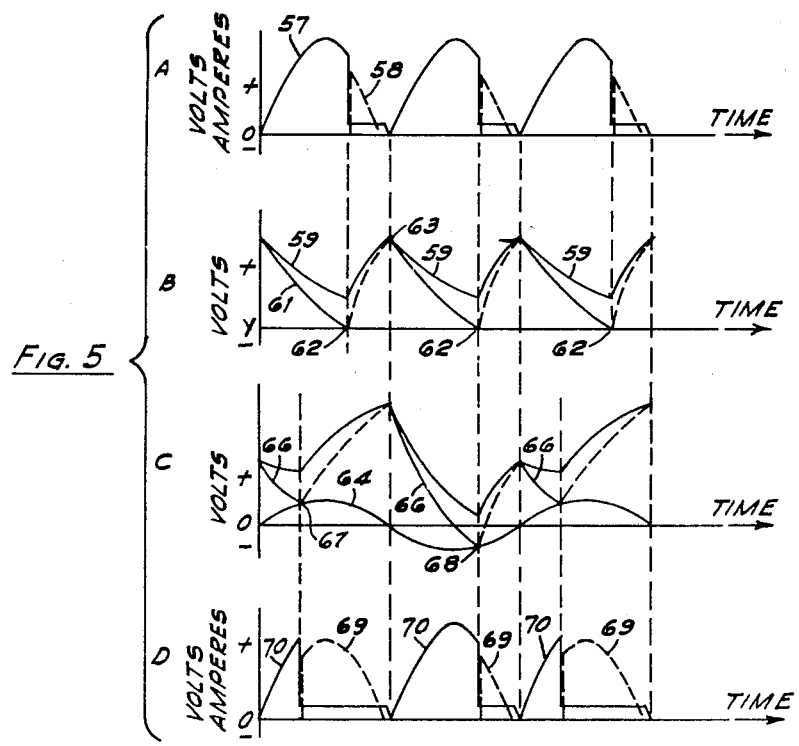
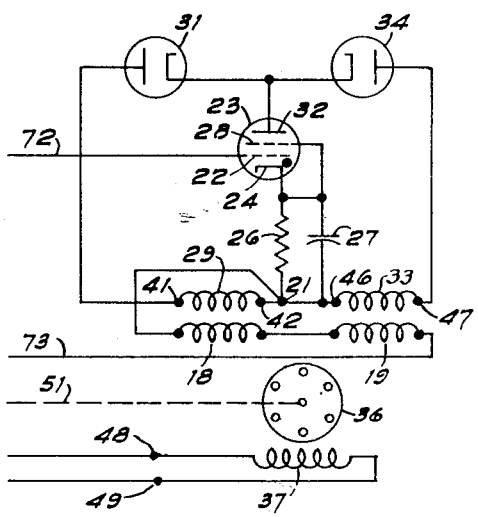
Inventor
JOHN W. GRAY
By
H. S. Mackey
Attorney Patented Nov. 7, 1950

2,529,469

UNITED STATES PATENT OFFICE 2,529,469

SHADED POLE MOTOR WITH THYRATRON CONTROL

John W. Gray, White Plains, N. Y., assignor to General Precision Laboratory Incorporated, a corporation of New York Application July 1, 1949, Serial No. 102,575

6 Claims. (Cl. 318—208)

1

This invention relates to control equipment for small electric motors and more particularly to equipment utilizing only a single thyratron discharge tube for the control of shaded pole motors.

Shaded pole motors find extensive application in servomechanisms. In this use they must be automatically and continuously controlled both as to direction of rotation and as to speed or torque in accordance with a servo error signal. This signal may be a continuously variable alternating voltage having either of two phases 180 degrees apart, or it may be a constant-voltage alternating current signal having its phase continuously variable over a 180 degree range, or a combination of the two. When the motor control is employed with either type of error signal the exactness of duplication by the servomechanism output signal of the input signal is dependent upon the accuracy with which the zero position or position of rest of the motor is maintained in terms of the input voltage or phase level.

A thyratron control for shaded pole motors employs two gaseous grid-controlled discharge tubes of the thyratron 3-element or 4-element type. In such a control very small voltages or phase changes control a relatively large motor torque or speed output but this control has a zero-speed and zero-torque point which depends on properly matching the characteristics of the thyratron tubes employed. Since these characteristics may vary widely during tube life and from tube to tube, such equipment has not heretofore been considered to be of precision type and its great sensitivity and power multiplication ability cannot in general be utilized to much advantage.

The present invention eliminates all effect of tube match variations upon the constancy of the zero position by employing only one thyratron tube in place of the two heretofore required. By so doing the thyratron motor control is qualitatively changed to a precision instrument, and a degree of precision in servomechanisms using thyratron control is attained in the field which could heretofore be attained only in laboratory-type equipment requiring continuous supervision and readjustment.

The present invention may also be employed with the type of servomechanism having two degenerative feedback loops, one having a feedback quantity representative of the motor speed and therefore termed a derivative feedback. It is customary to generate such a derivative feedback signal by employment of additional windings on the motor shading poles, but the reduction of the number of thyratron tubes to a single tube permits elimination of these additional windings and use of a resistance network in their place.

The circuit embodying the instant invention may employ either fixed or cathode bias, and may be used with either the variable-voltage or variable-phase type of error signal input.

Keeping the foregoing in mind, one purpose of the instant invention is to provide thyratron tube equipment for the control of electric motors in such a way as to make the zero speed motor condition independent of tube characteristics.

Another purpose of this invention is to provide thyratron tube equipment for use in servomechanisms to eliminate overshoot.

The exact nature of this invention will be more clearly understood from a consideration of the following description taken together with attached drawings, in which:

Figures 1, 4 and 6 are schematic illustrations of electromechanical circuits embodying the invention.

Figure 5 depicts graphs illustrating the principles of operation of the cathode bias arrangement of Figure 4.

Figure 1:
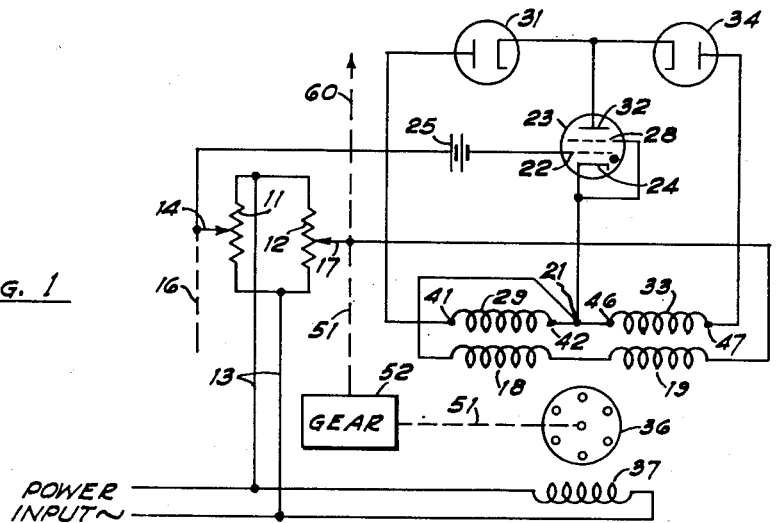

Referring now to Figure 1 a potential divider 11 is connected in shunt with a second potential divider 12 and both are connected at their common terminals through two conductors 13 to a single power source, which may be for supplying 60-cycle alternating current. The slider 14 of the potential divider 11 serves as the point of introduction of an input signal consisting of a mechanical displacement represented by the dashed line 16. This input signal is considered to have a zero displacement value when it places the slider 14 in the middle of its range, and the signal may vary in magnitude in either a positive or negative direction from this point. The other potential divider 12 has a slider 17 which is mechanically actuated by follow-up or negative feedback signals in a manner to be described later. This slider is electrically connected through windings 18 and 19 in series to a junction 21 and the slider 14 is electrically connected through a bias battery 25 to the control grid 22 of a screen-grid thyratron tube 23. The cathode 24 of this tube is connected directly to the junction 21, so that any difference of potential between the sliders 14 and 17 is impressed across the grid-cathode space of the thyratron 23, serving to control the tube. The pair of potential dividers thus serve to convert the mechanical displacement input signal into an electrical input or error signal for actuation of the thyratron tube. The thyratron screen grid 28 is connected to the cathode, and the anode circuit is completed through two parallel paths, one from the junction 21 through a winding 29 and diode 31 to the anode 32, and the other from the junction 21 through a winding 33 and diode 34 to the anode 32.

Figure 2:
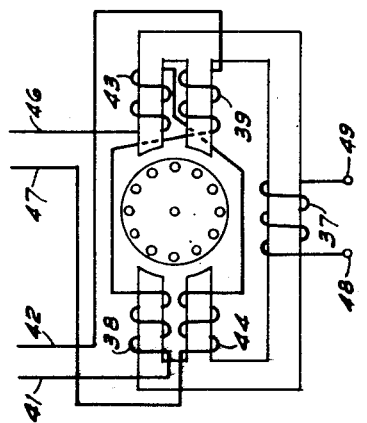
Figure 2 is a schematic illustration of a shaded pole motor.

The two windings 29 and 33 are the shading windings on a shaded pole induction motor having a squirrel-cage rotor 36 and a primary winding 37. This motor is depicted schematically in greater detail in Figure 2. The two coils 38 and 39 are connected in series aiding and together represent the winding 29 of Figure 1, having terminals 41 and 42. The two coils 43 and 44 also are connected in series aiding and represent the winding 33 of Figure 1 having terminals 46 and 47. Sixty-cycle potential is impressed across the terminals 48—49 of the primary winding 37. This well-known type of motor runs in one direction when one set of shading coils is short-circuited and in the opposite direction when the other set is short-circuited, so that, if the terminals 41 and 42 be short-circuited, the armature 36 will rotate in a counterclockwise direction, and if instead the terminals 46—47 be short-circuited, the armature 36 will rotate clockwise. If both sets of windings be short-circuited at one and the same time, or if both sets be left open, the rotor will remain stationary.

Returning to Figure 1, the motor rotor 36 drives the slider 17 through the shaft 51 and the reducing gear 52 in such sense as to restore the electrical input signal emitted by the potential dividers to zero. The shaft 51 thus constitutes a negative or degenerative feedback connection, and the entire electromechanical circuit constitutes a position servomechanism having a mechanical output shaft 60 actuated from the feedback shaft 51. A displacement of the slider 14 is translated to an electrical input to the thyratron tube, which serving as an electrical switch short-circuits one or the other of the windings 29 or 33, thus causing the motor to run in one direction or the other to move the slider 17 to such a point as to reduce the potential difference between the sliders to zero, when the motor stops.

The motor speed is in relation to the potential difference between the sliders as may be seen from the following analysis of the action. Initially the windings 18 and 19 are considered to be short-circuited and thus to have no effect. The fixed bias applied by the battery 25 is sufficient to prevent current flow through the thyratron in the absence of an input signal. When there is no mechanical input signal and both sliders are at the midpoints of their potential dividers there will be no electrical input signal or error potential. The thyratron being biased beyond cut off, it will not fire during any part of the cycle. With 60-cycle potential supplied to the primary winding 37, an alternating potential will be induced in the secondary or shading winding 29 and during the positive half cycles thereof the diode 31 becomes conductive so that the potential is applied to the anode 32 of the thyratron 23. Also a potential will be induced in the winding 33 and during those half cycles when positive potential is impressed on the diode 34 the latter becomes conductive, permitting the positive potential to be impressed on the anode 32. Therefore, since the windings 29 and 33 are in series aiding, the terminals 41 and 47 have instantaneously opposite potentials, and therefore the anode will be made continuously positive through the alternate conductivity of the two diodes 31 and 34. This action is illustrated in Figure 3 by graph A, in which the half cycles 53 represent potential impressed on the anode 32 through the diode 31 and the other half cycles 54 represent potential impressed through the diode 34.

The diodes 31 and 34 are employed because of their rectifying action, they having a very low impedance for positive impressed potentials and a very high or infinite impedance for negative potentials. These diodes also have a second function when their heaters are operated from the same switch as the heater of the thyratron tube 23. In such a case when the heaters are first turned on the heating lag of the diodes prevents plate potential from being impressed upon the thyratron until the cathode of the latter has begun to emit electrons, thus preventing damage to the thyratron. In place of the diodes 31 and 34 any other type of rectifier such as the copper oxide or selenium dry disc type may be employed except that this protective function will be lost.

Figure 3:
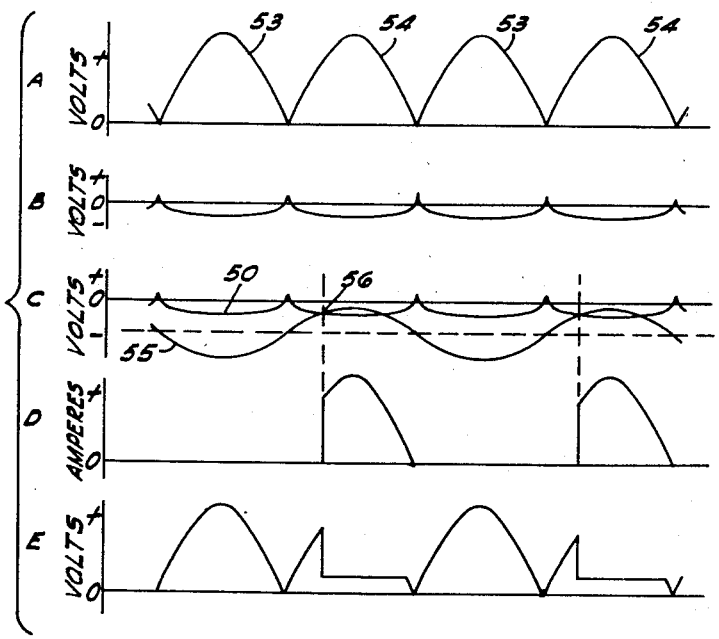
Figure 3 depicts graphs illustrating the principles of operation of the invention of Figure 1.

In Figure 3 the graph B represents the critical firing potential to which the control grid of the thyratron must be raised to fire the thyratron at the corresponding value of anode potential in graph A, as plotted from the characteristic curve published for the type of tube employed. Any thyratron may be employed as, for example, one of the type 2D21.

Let it be assumed that an input signal consists of a small upward mechanical displacement of the slider 14, Figure 1. This will apply a small error potential to the grid 22 which, let it be assumed, coincides in the time of its positive half cycles with the time during which the anode 32 is made positive through the diode 34 by potential induced in the winding 33. This grid potential may be represented by the curve 55 in graph C, Figure 3 and as it cuts the critical firing potential 50 which is reproduced from graph B, the tube will fire at the time 56 when the curves intersect, resulting in an anode current flow at the instant of cutting as shown in graph D and in an anode potential drop as shown in graph E. The grid loses control when the tube fires and anode current flows until the termination of the half cycle reduces the anode potential to zero and extinguishes the current. As a result, since the thyratron's internal resistance when fired is so low as to constitute a short circuit across one of the motor secondary windings, the rotor turns clockwise at a speed dependent on the area of graph D and therefore dependent on the time of cutting by the input signal and on the magnitude and phase of the signal. Rotation of the motor moves the slider 17 upward, which in turn diminishes the speed of the motor until the error signal has been reduced to zero, bringing the motor to a standstill. The amount that the motor has rotated is then proportional to the amount that the slider 14 was moved by the displacement input signal, and the movement of the slider 14 has been imitated by an equal movement of the slider 17. The whole device thus constitutes a position servomechanism with an output motion at the slider 17 which may be utilized by other equipment.

If instead of an upward mechanical displacement a downward displacement be given to the slider 14, the error signal impressed on the grid 22 will be displaced 180 degrees in phase from that of the first case, the critical potential 54 in graph C will be intersected at its opposite phase, the anode 32 will receive its potential from the winding 28 and the motor will run counterclockwise.

Figure 4 illustrates the employment of cathode bias in place of fixed bias in a circuit such as that of Figure 1. Figure 4 is identical with Figure 1 except that the battery 25 for furnishing a fixed bias to the control grid 22 of the thyratron 23 is replaced by a cathode resistor 26 bypassed by a condenser 27. For clarity the potential dividers 11 and 12 and the gear 52 have been omitted, the conductors 72 and 73 representing connection to a signal source such as the potential divider sliders 14 and 17 respectively of Figure 1, the shaft 51 leading to a feedback slider such as the slider 17 of Figure 1 and the terminals 48 and 49 being connected to a source of alternating current power. Because of the action of the bypassed cathode resistor, the bias in Figure 4 is proportional to the cathode current and in addition the use of cathode bias is made to be highly beneficial by adjusting it so that some current will flow in every half cycle even in the absence of any input signal. In this situation these currents will neutralize each other so that the motor does not rotate, but sensitivity of operation is greatly increased and zero error is greatly diminished. The operation with cathode bias is as follows.

When there is no input signal the employment of a bypassed cathode resistor causes the thyratron when properly adjusted to fire every half cycle, so that its anode potential is as shown in graph A, Figure 5, by the character 57, while the corresponding anode current is depicted by the dashed line 58. Since equal currents flow during equal times in every half cycle the motor remains stationary. The potential of the cathode 24 falls during the unfired portion of the half cycle from the positively charged condition which it had during the previous period of current flow. This potential fall is retarded as indicated in graph E by the curve 59 because of the time required to discharge the condenser 27 through the cathode resistor 26. The curve 61 represents the sum of potential 59 and the critical potential shown in graph B, Figure 3, so that firing occurs when the curve 61, Figure 5B, touches the base line of reference potential Y at the time 62. After firing, the curve 61 rises but is shown dashed to indicate that the grid has lost control of the tube. At the termination of the half cycle of anode potential the cathode reaches its highest positive potential, controlled by the slowly-charging condenser 27, at the time 63 and the process begins anew.

When an eror signal is introduced between the grid 22 and the junction 21, Figure 4, the effect is to vary the reference potential Y, graph B, Figure 5. This effect is shown in graph C, where the curve 64 represents this signal or reference potential. Firing now occurs when the curve 66, representing the sum of cathode and critical potentials, touches the reference potential curve 64 at the time 67. However, a half-cycle later the phase of the reference potential or error signal is opposite, so that firing does not occur until time 68. Succeeding half cycles of current are now no longer symmetrical and equal but preponderate in alternate half cycles as shown in graph D by curve 69, with the corresponding anode potentials shown by curve 70. As a result the motor rotates at a speed proportional to the difference in successive areas of the current curve 69 and in a direction dependent upon the sense of the input signal.

The servomechanism as so far described has a follow-up action of the slider 17 which diminishes in speed as the zero error signal is approached, but nevertheless which may overshoot, and may oscillate or hunt about this zero position. Proper action is improved by the addition of a derivative correction signal. This is accomplished by the addition of two windings 18 and 19, Figures 1 and 4, which may be wound in a cofilar manner with the shading windings 29 and 33. The windings 18 and 19 are connected in series opposition with each other, and the pair of windings is connected between the slider 17 and the junction 21. Any net potential generated by these windings is thereby placed in series with the error signal potential. The sense is arranged so that any net potential of these windings is in opposition to the potential of the error signal.

Since the winding 18 is cofilar with the winding 29 these windings will have equal potentials simultaneously induced in them by induction from the primary winding 37. Likewise the potentials induced in windings 19 and 33 will be equal, and equal to those induced in the former windings. Since windings 18 and 19 are connected in opposition, these induced potentials will exactly and completely cancel each other at any instant and there will be no effect caused by them on the grid 22. However, another potential is also induced in the windings 18 and 19 by reason of current flow in the armature 36. When the armature is stationary this induced potential is equal in the two coils 18 and 19 and is approximately opposite to that induced directly by the primary winding 37. But the current in the armature 36 lags the potential because its winding is inductive, so that when the armature rotates, as for instance in a clockwise direction in Figure 2, armature-induced potentials in the coils 38 and 39 and in any coil wound in cofilar relation therewith will be greater than in the coils 43 and 44 and in coils cofilar therewith. As a result, in Figures 1 and 4, the potentials in coils 18 and 19 composed of the differences between those induced directly by the primary winding and those induced by the rotor 36 no longer balance but the potential of coil 18 will predominate, and a net potential is produced which is proportional to the speed of rotation of the motor. Since the speed is a first derivative function of the angular displacement, the net output of the windings 18 and 19 is a derivative function of the displacement of the slider 17 relative to the slider 14. As a result, for high speeds of error correction the derivative signal is large but for low speeds, as when the error signal has been brought nearly to zero, the derivative signal is for practical purposes zero, so that the difference signal has approximately the full value of the error signal and the nullpoint sensitivity is unimpaired.

Figure 6:
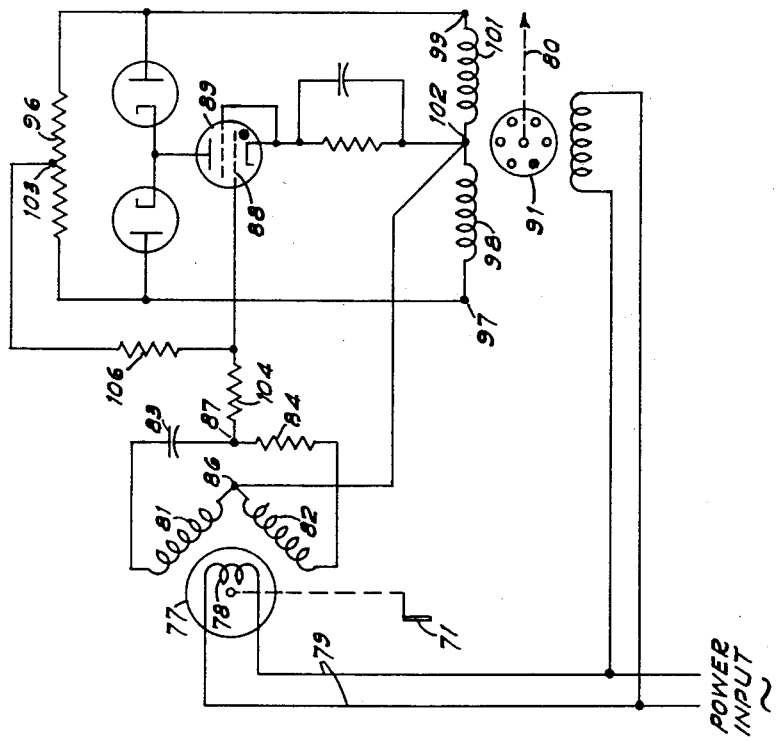

Figure 6 illustrates another preferred embodiment of this invention. The input signal is as before accomplished by a mechanical displacement, but in this case it is rotational, not translatory, and no limitation is imposed upon its amount. It is represented schematically by a crank 71. This crank is connected to a rotor 77. This rotor carries a winding 76 energized from a 60-cycle power source through conductors 79. The rotor coil 78 is in inductive relation to two equal stator coils 81 and 82 which are physically arranged in mutual space quadrature relationship and which are electrically connected in series with a condenser 83 and resistor 84 of equal impedance, so that $$R = \frac{1}{\omega C}$$

where R is the resistance of the resistor 84, ω is the frequency of the power source in radians per second, i. e., 2 πf and C is the capacitance of the condenser 83. Output connections taken from terminals 86 and 87 have constant alternating potential for all positions of the rotor 77 but have a phase compared with that of the power source which varies from 0 to 360° in direct proportion to the angular position of the rotor 77. This potential at varying phase constitutes the signal to the control grid 88 of a thyratron tube 89 which is connected in a shaded pole motor control circuit identical to that of Figure 1 except for the derivative circuit. As will be noted by reference to graph C of Figure 5, a continuous variation of the phase of the input signal 64 at constant potential over 180° will have an effect somewhat similar to the continuous variation of the potential of the input signal from a positive to a like negative value with the phase fixed. The operation of the thyratron of Figure 6 from the mechanical displacement signal will therefore be similar to the operation of the circuit of Figure 4 as before described and so its description will not be repeated.

The motor rotor 91 is connected to a shaft 80 that constitutes the output of the device. The sense, speed, and torque of this shaft are controlled by the sense and magnitude of phase shifts originated by rotational displacements of the crank 71.

The derivative circuit employed in Figure 6 does not require special motor windings. In place thereof it employs a center-tapped resistor 96 connected between the terminal 97 of the shading coil 98 and the terminal 99 of the shading coil 101. In describing the derivative circuit of Figures 1 and 4 two kinds of potentials were described as being induced in the extra derivative windings 18 and 19, one due directly to induction from the primary winding and the other due to induction from the rotor current. Exactly similar potentials are, of course, also induced in the motor secondary windings themselves, 98 and 101, Figure 6, and the net effect of these potentials is utilized but in a somewhat different manner. When the armature is stationary the difference between these two kinds of potential in winding 98 exactly equals the difference in winding 101, so that the junction 102 is midway in potential between the potentials of terminal 97 and terminal 99. Likewise the center tap 103 is midway in potential between that of terminal 97 and terminal 99, so that zero potential exists between junction 102 and center tap 103. However, when the armature rotates, the potentials in the coils 98 and 101 due to armature reaction become different, so that the net potentials of these coils are different, the potential of junction 102 is no longer median between those of terminals 97 and 99 and hence a potential arises between the junction 102 and the center tap 103. This potential is in direct proportion to the speed of the rotor and in sense is dependent upon the sense of rotation. It is subtracted from the error signal by means of a subtracting network composed of resistor 104 in series with the error signal source and resistor 106 connecting the center tap 103 with the control grid 88. The derivative signal developed between terminals 102 and 103 then is impressed across the resistor 104 in which a potential drop is developed proportional to the derivative signal, and in series with the error signal. The polarities are so arranged that the derivative signal potential is opposed to the error signal potential, so that the effect is to stabilize the circuit similar to the effect of the derivative circuit of Figures 1 and 4.

In place of the thyratron tube employed in Figures 1, 4 and 6, any other thyratron tube or any other suitable discharge tube such as a high vacuum type having at least an anode, cathode and control grid may be employed.

What is claimed is:

1. A control circuit comprising, means for producing an alternating current signal, a discharge tube having said signal impressed on its input, a shaded pole motor including a pair of shading coils connected in aiding relation, a shunting circuit including a rectifier for one of said shading coils, a second shunting circuit including a second rectifier for the other of said shading coils, a circuit common to said shunting circuits including the cathode-anode path of said discharge tube and a pair of coils in the same respective positions in the magnetic circuit as said shading coils, said pair of coils being connected in series with each other and said means for producing an alternating current signal.

2. A control circuit comprising, means for producing an electrical signal quantity, a single discharge tube having said signal quantity impressed on its input, a shaded pole motor including a pair of shading coils, means including the anode-cathode path of said discharge tube and a pair of rectifiers for alternately shunting one or the other of said shading coils for respective periods of time dependent in relative duration on the sense and amplitude of said signal quantity, and a pair of coils in the same respective positions in the magnetic circuit as said shading coils, said pair of coils being connected in series with each other and said means for producing an electrical signal quantity.

3. A control circuit comprising, means for producing an alternating current signal potential, a single gas discharge tube having said signal potential impressed on its input, a shaded pole motor including a first and second shading coil, means including the anode-cathode path of said gas discharge tube and a pair of rectifiers for alternately shunting one or the other of said shading coils for respective periods of time dependent in relative duration on the sense and amplitude of said signal quantity, and first and second derivative coils wound coaxially with said first and second shading coils respectively connected in series with each other and in series with said means for producing the alternating current signal potential whereby said potential is neutralized by an amount which is a direct function of the speed of said motor.

4. A control circuit comprising, means for producing an alternating current signal potential, a single gas discharge tube having said signal potential impressed on its input, an alternating current power source, a shaded pole motor connected to said power source and including first and second shading coils connected in series aiding relation, a bypassed cathode resistor having one end connected to the cathode of said gas discharge tube and its other end connected to the common terminal of said shading coils, a first shunting circuit for one of said shading coils including the anode-cathode path of said gas discharge tube and a first diode rectifier whose cathode is connected to the anode of said gas discharge tube, a second shunting circuit for the other of said shading coils including the anode-cathode path of said gas discharge tube and a second diode rectifier whose cathode is connected to the anode of said discharge tube, and first and second derivative coils wound on the respective magnetic axes of said first and second shading coils, said derivative coils being connected in series with each other and with said means for producing the alternating current signal potential whereby said potential is neutralized as a function of the speed of said motor.

5. A control circuit comprising, means for producing an alternating current signal potential, a single gas discharge tube having said signal potential impressed on its input, an alternating current power source, a shaded pole motor connected to said power source and including first and second shading coils connected in series aiding relation, a bypassed cathode resistor for said tube having one end connected to the cathode of said gas discharge tube and its other end connected to the common junction of said first and second shading coils, a first shunting circuit for said first shading coil including the anode-cathode path of said gas discharge tube and a first diode rectifier whose cathode is connected to the anode of said gas discharge tube, a second shunting circuit for said second shading coil including the anode-cathode path of said gas discharge tube and a second diode rectifier whose cathode is connected to the anode of said gas discharge tube, a connection from the anode of said first diode to the end of said first shading coil remote from said common junction, a connection from the anode of said second diode to the end of said second shading coil remote from said common junction, a center-tapped resistor connecting the anodes of the diodes, and a resistive network connecting said center tap to the input of said gas discharge tube for the purpose of superimposing a derivative potential thereon.

6. A control circuit comprising, means for producing an alternating current signal potential, a single tube having said signal potential impressed on its input, an alternating current power source, a shaded pole motor connected to said power source including first and second shading coils connected in series aiding relation, a bypassed cathode resistor having one end connected to the cathode of said tube and its other end connected to the common terminal of said shading coils, a first shunting circuit for one of said shading coils including the anode-cathode path of said tube and a first rectifier, a second shunting circuit for the other of said shading coils including the anode-cathode path of said tube and a second rectifier, said first and second rectifiers being connected in opposition and having their juncture connected to the anode of said tube, and first and second derivative coils wound on the respective magnetic axes of said first and second shading coils, said derivative coils being connected in series with each other and with said means for producing the alternating current signal potential.

JOHN W. GRAY.

REFERENCES CITED

The following references are of record in the file of this patent:

UNITED STATES PATENTS

| Number | Name | Date |
| --- | --- | --- |
| 2,191,997 | Side | Feb. 27, 1940 |
| 2,270,991 | Bagno | Jan. 27, 1942 |
| 2,399,675 | Hays | May 7, 1946 |
| 2,417,868 | Glass | Mar. 25, 1947 |